MULTI-CHANNEL COMMUNICATION SYSTEMS

Filed June 29, 1962 6 Sheets-Sheet 1

INVENTORS
SAHIR SABIR HAKIM
JOHN CYRIL VINES
BY Kinderlen, Kinderlen & Ottinger
ATTORNEYS INVENTORS
SAHIR SABIR HAKIM
JOHN CYRIL VINES
BY [signature]
ATTORNEYS

MULTI-CHANNEL COMMUNICATION SYSTEMS

Filed June 29, 1962 6 Sheets-Sheet 3

INVENTORS
SAHIR SABIR HAKIM
JOHN CYRIL VINES
BY Kinckstein, Kinckstein & Ottinger
ATTORNEYS July 19, 1966 S. S. HAKIM ETAL 3,261,921
MULTI-CHANNEL COMMUNICATION SYSTEMS
Filed June 29, 1962 6 Sheets-Sheet 4

INVENTORS
SAHIR SABIR HAKIM
JOHN CYRIL VINES
BY Kirschstein, Kirschstein & Ottinger
ATTORNEYS

MULTI-CHANNEL COMMUNICATION SYSTEMS

Filed June 29, 1962 6 Sheets-Sheet 5

INVENTORS
SAHIR SABIR HAKIM
JOHN CYRIL VINES
BY Kurdelin, Kurdelin & Ottge
ATTORNEYS

MULTI-CHANNEL COMMUNICATION SYSTEMS

Filed June 29, 1962 6 Sheets-Sheet 6

INVENTORS
SAHIR SABIR HAKIM
JOHN CYRIL VINES
BY Kinckerbocker, Kinckerbocker & Ottinger
ATTORNEYS 3,261,921
Patented July 19, 1966

3,261,921

MULTI-CHANNEL COMMUNICATION SYSTEMS

Sahir Sabir Hakim and John Cyril Vines, Coventry, England, assignors to The General Electric Company Limited, London, England, a British company Filed June 29, 1962, Ser. No. 206,340
8 Claims. (Cl. 179—15)

Figure 1:
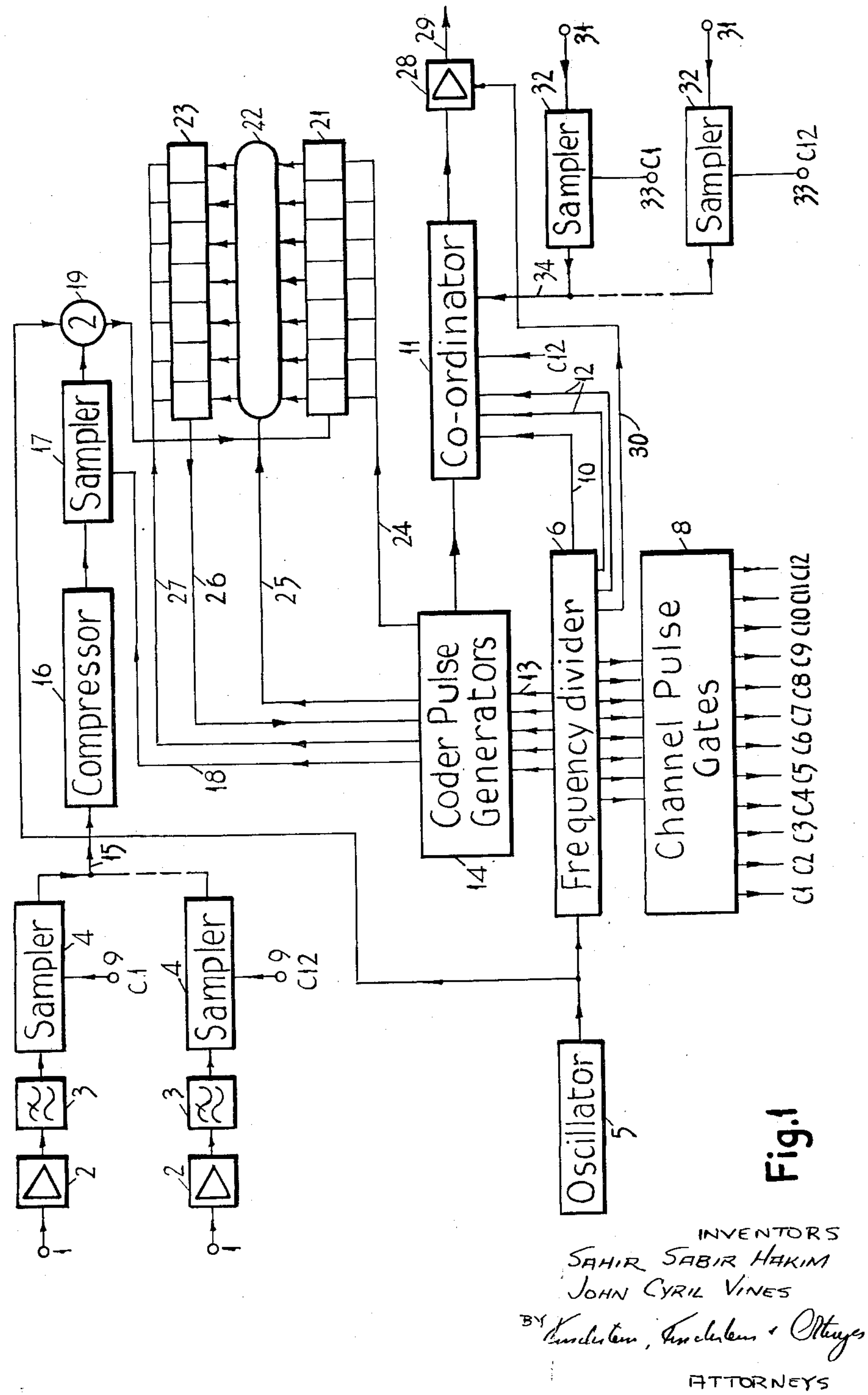

This invention relates to multi-channel communication systems.

In a known multi-channel communication system, the signal which is transmitted from the transmitting terminal to the receiving terminal includes information signals, and also further signals which provide synchronising information.

In a telephone system which operates using time division multiplex and pulse code modulation, equipment at the transmitting terminal operates to sample, in rotation and at regularly recurrent instants, the amplitudes of a plurality of audio frequency signals which are to be transmitted over the various channels of the system, and the sample amplitudes so obtained are then represented by code groups of pulses which form said information signals. The further signals, which provide synchronising information, are included so that equipment at the receiving terminal shall be able to distinguish the information signals corresponding to the various audio frequency signals.

It may be desired that additional signals should also be transmitted, these additional signals being used to provide signalling information which, in the particular case of a telephone system, is used to set up, maintain or supervise calls on the various channels of the system.

One object of the present invention is to provide a multi-channel communication system in which provision is made for transmitting additional signals which provide signalling information.

According to one aspect of the present invention, transmitting terminal equipment for a multi-channel communication system in which the signal transmitted comprises a combination of information signals representing information to be transmitted over the various channels respectively and further signals which provide synchronising information, includes means periodically to substitute additional signals which provide signalling information for said further signals for a short interval, and means to suppress said further signals for a short interval immediately prior to each interval during which said substitution is to be made.

According to another aspect of the present invention, receiving terminal equipment for a multi-channel communication system in which the signal transmitted comprises a combination of information signals representing information to be transmitted over the various channels respectively and further signals which provide synchronising information, and wherein signals which provide signalling information are periodically substituted for said further signals for a short interval and said further signals are suppressed for a short interval immediately prior to each interval during which said substitution is to be made, includes means to distribute said information in respect of signals to be transmitted over the various channels respectively to equipment individual to those channels in dependence upon the synchronising information, means to recognise the absence of said further signals from the received signal, and means operated in dependence upon said last mentioned means to utilise said additional signals which provide signalling information.

Figure 2:
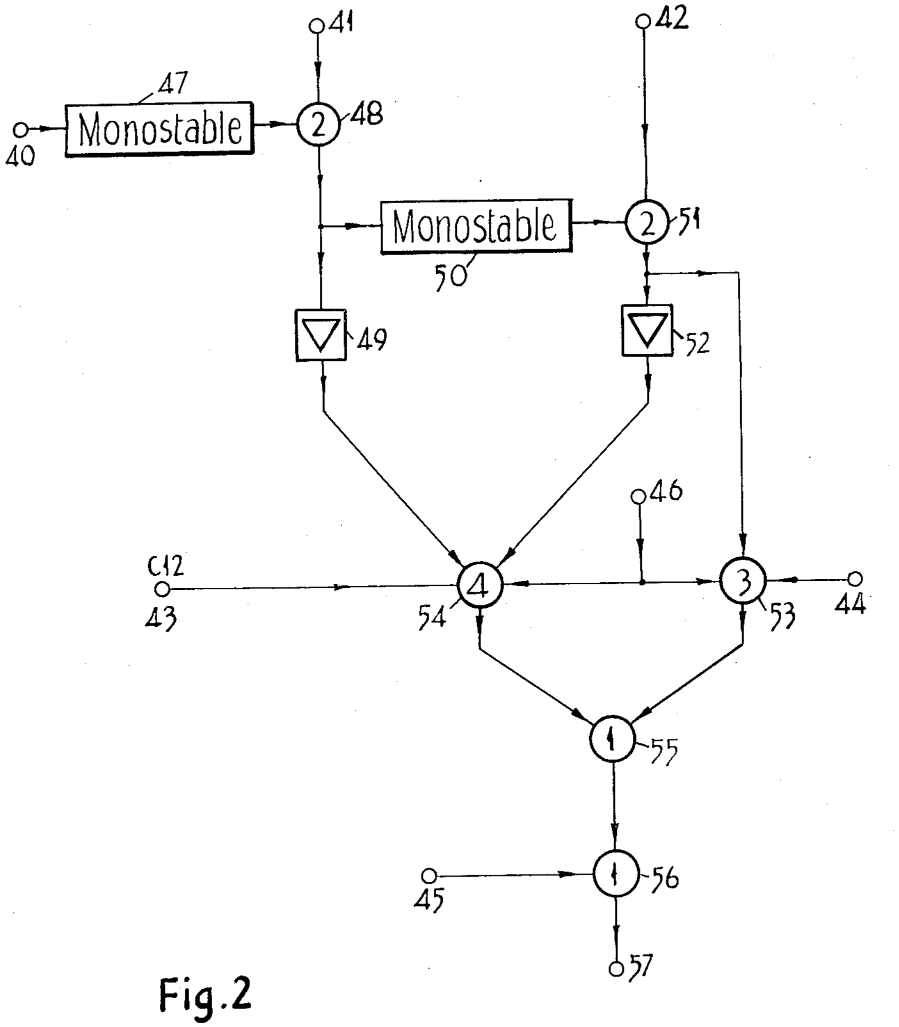
Figure 3:
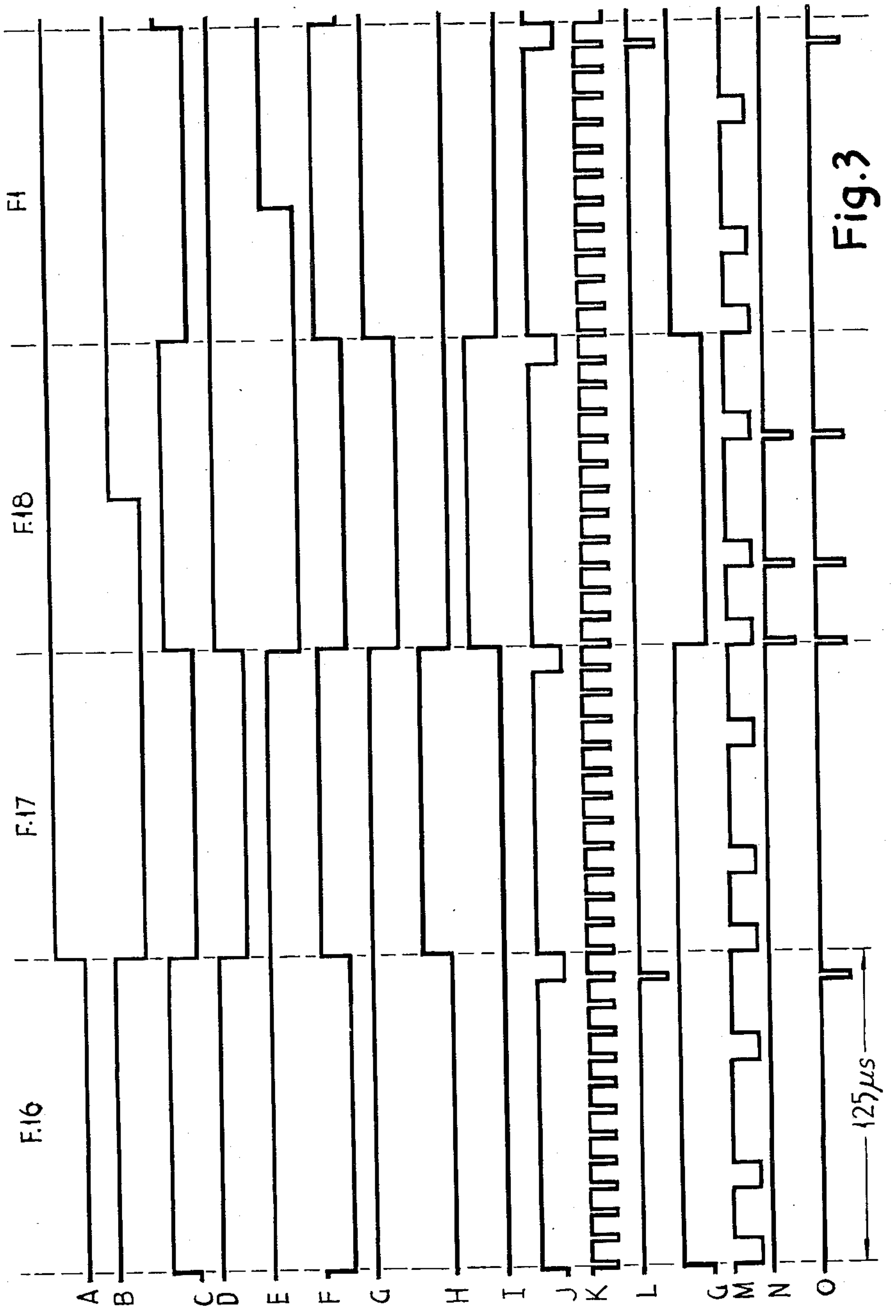
Figure 4:
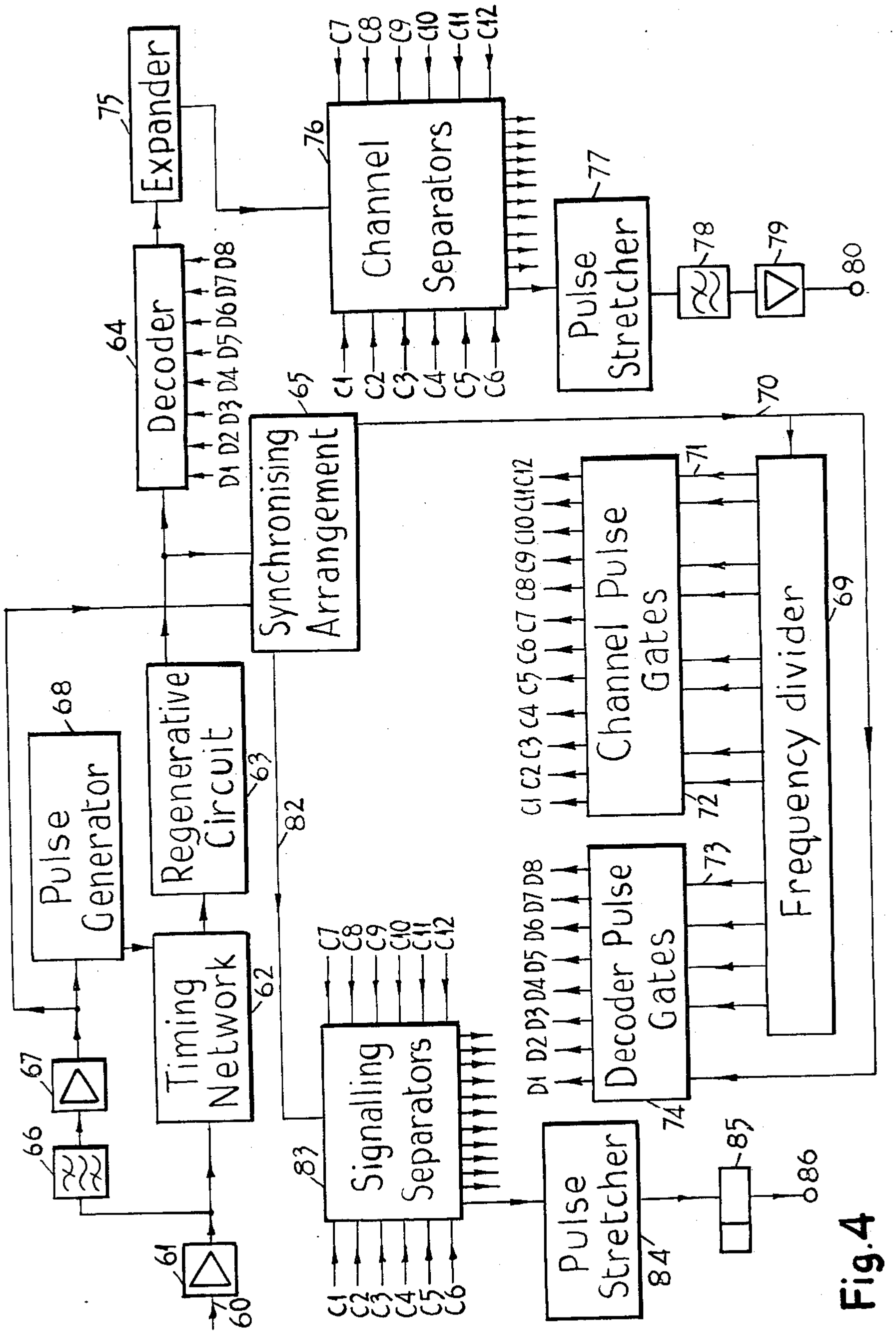
Figure 5:
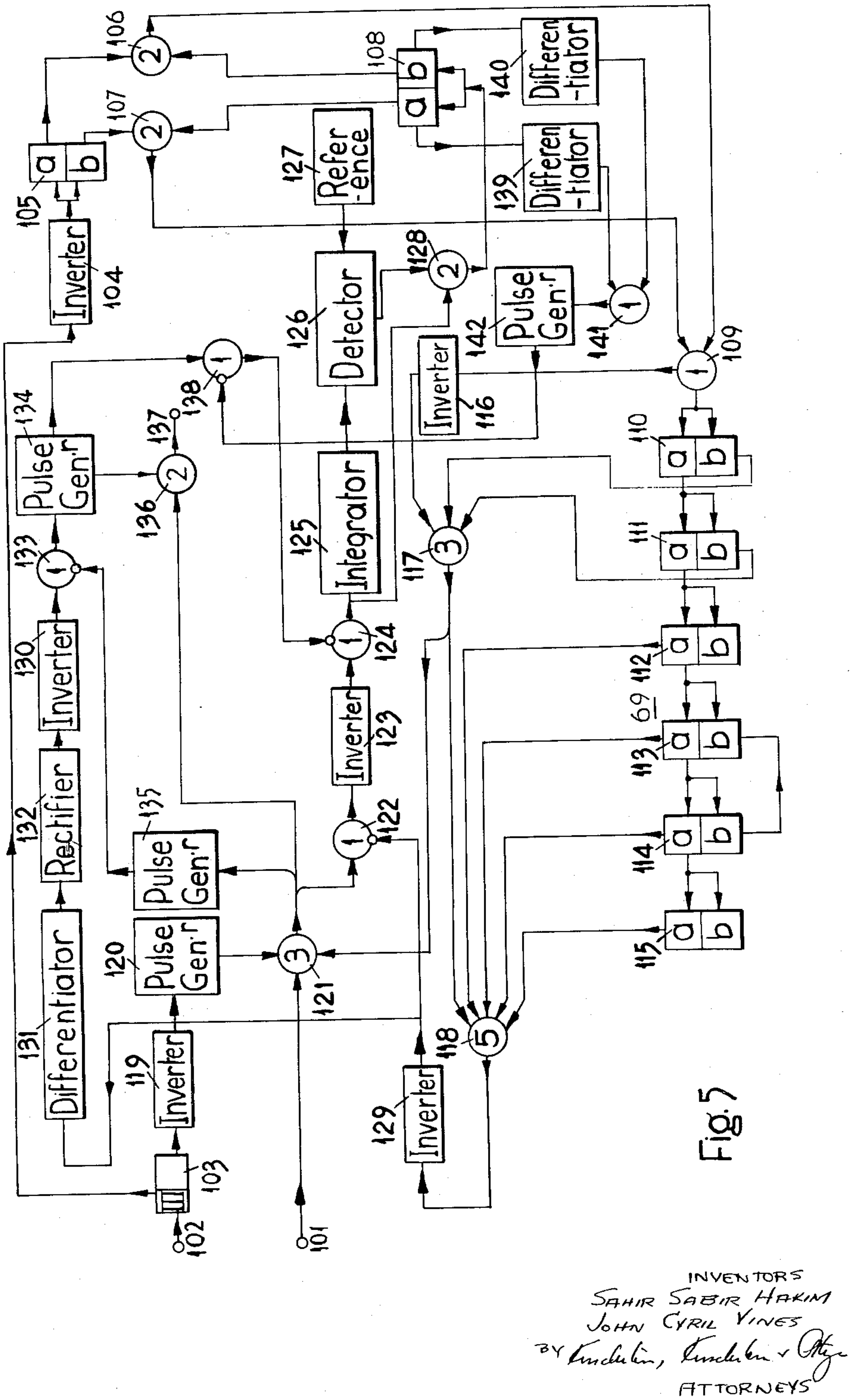
Figure 6:
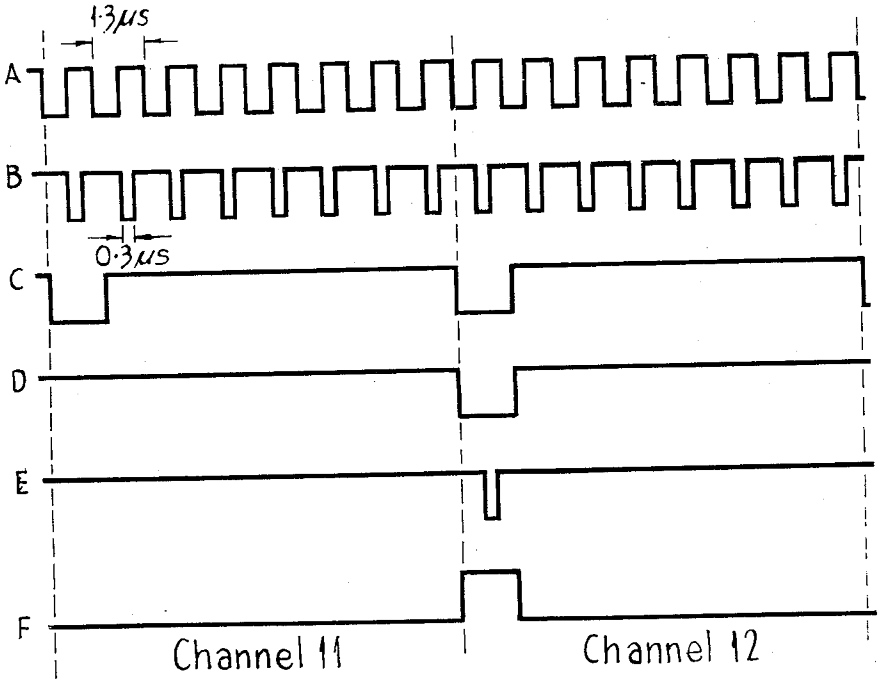

A multi-channel communication system in accordance with the present invention will now be described by way of example with reference to the accompanying drawings, in which:

FIGURE 1 shows the transmitting terminal of the system in simplified block schematic form, FIGURE 2 shows a part of the transmitting terminal of FIGURE 1 in more detail, although still in block schematic form, FIGURE 3 shows the waveforms of the signals appearing during operation at various points in the part of the transmitting terminal shown in FIGURE 2, FIGURE 4 shows the receiving terminal of the system in simplified block schematic form, FIGURE 5 shows a part of the receiving terminal of FIGURE 4 in more detail, although still in block schematic form, and FIGURE 6 shows the waveforms of the signals appearing during operation at various points in the part of the receiving terminal shown in FIGURE 4.

The system to be described is a telephone system which makes use of pulse code modulation, but it will be appreciated that the invention is not limited to such systems.

The system has twelve channels over which information in respect of twelve audio frequency signals is to be transmitted making use of time division multiplex. The amplitude of each of the audio frequency signals is sampled at regularly recurrent instants, and the resulting sample amplitudes are coded using a binary code having seven digits, each of which may be "1" or "0," and which are represented by the presence or absence, respectively, of a pulse. These seven digits form a code group. An eighth digit is then added at the beginning of each code group for the purpose of providing synchronising information, the complete group of eight digits forming a channel group. Twelve channel groups, one in respect of each of the twelve channels in rotation, are then combined in sequence to form a frame, and successive frames are combined in sequence to form the signal which is transmitted.

Each of the signals which provide the required synchronising information comprises twelve digits in all, these being the first digit in each channel group in a frame. Of these digits, the first digit in each of the first eleven channel groups in each frame is a "0" and the first digit in the twelve channel group is a "1."

At the receiving terminal, equipment is provided which separates the first digit in each channel group from the remainder of the channel group, and operates to pass the code group from the channel group having the digit "1" as its first digit to equipment corresponding to channel 12 and the other eleven code groups in the frame to equipment corresponding to the remaining channels in rotation.

Furthermore, it is then desired periodically to transmit signalling information which is used to set up, maintain or supervise calls on the various channels of the system. This signalling information is transmitted at a frequency of 444.4 cycles per second, that is, once every 18th frame, making use of the first digit in each channel group. When the signalling information is to be transmitted, the first digit in the channel group corresponding to the twelth channel is made a "0" for one frame, so that in that frame the first digit in each channel group is a "0". This means that for that frame the signal which provides synchronising information is suppressed. Then, in the immediately following frame, the first digit of each channel group is made "0" or "1" in dependence upon the signalling information to be transmitted.

The receiving terminal then includes equipment which first recognises that the synchronising information has been suppressed in one frame, and having recognised this is conditioned to pass the signalling information which is present in the immediately subsequent frame to the equipment where it is to be utilised. There is thus an interval of two frames duration during which no synchronising information is received, but this interval is small, both absolutely and as a percentage of the total time, so that the receiving terminal is able to maintain synchronisation during these intervals.

Referring now to FIGURE 1 of the drawings, the twelve incoming audio frequency signals are supplied to input terminals 1, there being a terminal 1 for each of the twelve channels. For the moment, only the equipment provided for channel 1 will be considered, as the equipment provided for the remaining eleven channels is identical. The terminal 1 is connected to an amplifier 2, the output of which is supplied by way of a low-pass filter 3 to a sampling network 4.

The transmitting terminal also includes an oscillator 5 which supplies a signal having a frequency of 13.824 megacycles per second to a frequency divider 6 formed by a chain of cascade-connected two condition bistable trigger circuits. The frequency divider 6 operates in known manner to divide the frequency of the signal supplied by the oscillator 5. Several output signals are derived from the frequency divider 6, some of these signals being as follows. Eight outputs are derived from the frequency divider 6 and are supplied to a series of channel pulse gates 8, the channel pulse gates 8 operating to supply output signals hereinafter designated C1, C2 . . . C12. The signals C1 to C12 comprise pulses occurring in the signals C1 to C12 in rotation, these pulses defining the instants at which samples are taken of the audio frequency signals on the various channels. The signals C1 to C12 are therefore supplied to terminals 9 connected to the respective sampling networks 4 corresponding to the various channels.

The frequency divider 6 supplies a signal having a frequency of 444.4 cycles per second over a lead 10 to an output coordinator 11, and also supplies two signals each having a frequency of 4 kilocycles per second over two leads 12 respectively to the coordinator 11.

The frequency divider 6 also supplies signals over a group of five leads 13 to control the operation of coder pulse generators 14.

The outputs of the sampling networks 4 corresponding to all the channels are supplied over a common highway 15 to the input of a compressor 16, the output of which is supplied to a further sampling network 17. The sampling network 17 is controlled by signals supplied over a lead 18 from the coder pulse generators 14. The output of the sampling network 17 is connected to a gate 19, to which is also supplied a train of clock pulses having a repetition frequency of 13.824 megacycles per second, the clock pulses being derived from the oscillator 5. The gate 19 is an "AND" gate, so that its output comprises the clock pulses gated in dependence upon the signal supplied by the sampling network 17.

The clock pulses passed by the gate 19 are supplied to a seven stage binary counter 21. The stages of the counter 21 are connected by way of transfer gates 22 to the seven stages respectively of a shift register 23.

The coder pulse generators 14 operate to supply the following signals at the required times: first, a signal over a lead 24 to reset the counter 21; secondly, a signal over a lead 25 to cause the digits stored in the counter 21 to be transferred by way of the transfer gates 22 to the corresponding stages of the shift register 23; and thirdly, a signal over a lead 27 to the shift register 23 to cause the digits stored in the shift register 23 to be shifted and supplied over a lead 26 to the coder pulse generators 14. The output of the coder pulse generators 14 is supplied to the coordinator 11, the output of which is supplied by way of an amplifier arrangement 28 to the outgoing line 29. The arrangement 28 amplifies and shapes the outgoing pulse signal and, in addition, operates to ensure that the outgoing signal is correctly timed. To provide the timing, the arrangement 28 is supplied with a signal having a frequency of 768 kilocycles per second from the frequency divider 6 over a lead 30.

In addition, the transmitting terminal includes a series of terminals 31, one corresponding to each of the twelve channels. When signalling information is to be transmitted in respect of a channel, a voltage is arranged to be applied to the terminal 31 corresponding to that channel. Again considering channel 1 only, the equipment being identical for all the channels, the terminal 31 is connected to a sampling network 32 which also has a terminal 33 to which the signal C1 is supplied. The output signals supplied by the twelve sampling networks 31 are passed over a common highway 34 to the coordinator 11.

Briefly, the operation of the transmitting terminal is as follows. The amplitudes of the incoming audio frequency signals supplied to the terminals 1 are sampled by the sampling networks 4 in rotation under the control of the signals C1 to C12. This results in an amplitude modulated pulse signal being supplied over the highway 15 to the compressor 16. The output signal supplied by the compressor 16, which operates to compress amplitude samples of large amplitude relative to those of smaller amplitude, is supplied to the sampling network 17 which is controlled by the coder pulse generators 14 to supply a pulse width modulated signal to the gate 19.

Each of the pulses in the pulse width modulated signal corresponds to a sample amplitude in respect of the audio frequency signal on one of the channels, and considering one only of these pulses, it will control the gate 19 so that a group of clock pulses reach the counter 21, the number of clock pulses being dependent on the amplitude of the relevant sample amplitude. The group of clock pulses passed by the gate 19 result in the counter 21 being set up to represent the number of clock pulses in the group in binary form.

When the count has been completed, the coder pulse generators 14 operate so that the count is transferred to the shift register 23. The seven binary digits representing the count, which digits in fact form a code group, are then transferred to the coder pulse generators 14 and are supplied thereby to the coordinator 11 with a timing such that the seven digits of the code group occur in time positions corresponding to the last seven pulse positions in a channel group.

It is convenient now to consider the coordinator 11 in more detail, reference being made to FIGURE 2 of the drawings. The coordinator 11 has seven input terminals 40, 41 . . . 46 which are connected as follows. The terminal 40 is connected by way of the lead 10 to the frequency divider 6. The terminals 41 and 42 are connected by way of the two leads 12 respectively to the frequency divider 6. The terminal 43 is connected to the channel pulse gates 8 so as to be supplied with the signal C12. The terminal 44 is connected to the highway 34. The terminal 45 is connected to the coder pulse generators 14, so as to be supplied with the code groups of pulses previously referred to. The terminal 46 is connected to a part of the transmitting terminal not previously referred to, this part of the terminal operating to supply what is hereinafter referred to as the "digit 1" pulses. These pulses are in fact a train of pulses which occur at a frequency and in time positions corresponding to the first digit in each channel group.

Referring only to FIGURE 2 now, the terminal 40 is connected to a two-condition monostable trigger circuit 47, which is arranged to be triggered into its unstable condition by the positive leading edge of any pulse supplied thereto. When triggered into its unstable condition the monostable circuit 47 remains in this condition for 187.5 microseconds.

The output of the monostable circuit 47 is connected to one of the two inputs of an "AND" gate 48, the other input of which is connected to the terminal 41. The output of the gate 48 is connected to an amplifier 49, and also to a monostable circuit 50 which is similar to the monostable circuit 47. The output of the monostable circuit 50 is connected to one of the two inputs of an "AND" gate 51, the other input of which is connected to the terminal 42. The output of the gate 51 is connected to an amplifier 52 and also to one of the three inputs of an "AND" gate 53. The other two inputs of the gate 53 are connected to the terminals 44 and 46 respectively.

The outputs of the amplifiers 49 and 52 are connected to two of the four inputs of an "AND" gate 54. The other two inputs to the gate 54 are connected to the terminals 43 and 46 respectively.

The outputs of the gates 53 and 54 are connected to the two inputs respectively of an "OR" gate 55. The output of the gate 55 is connected to one of the two inputs of an "OR" gate 56, the other input of which is connected to the terminal 45. The output of the gate 56 is connected to a terminal 57, the terminal 57 being in fact connected to the arrangement 28 (FIGURE 1).

Referring now to FIGURE 3 of the drawings also, the operation of the part of the transmitting terminal shown in FIGURE 2 is as follows. The signal supplied to the terminal 40 is as represented by the waveform A of FIGURE 3. The signals supplied to the terminals 41 and 42 are as represented by the waveforms C and F of FIGURE 3, these signals being similar to one another but reversed in polarity. The signal C12 supplied to the terminal 43 is as represented by the waveform J of FIGURE 3. The signal supplied to the terminal 44 may, for example, be as represented by the waveform N of FIGURE 3, it having been assumed that signalling information is to be transmitted in respect of the first, fourth and ninth channels. The signal supplied to the terminal 45 is not represented in FIGURE 3, but comprises the code groups supplied from the coder pulse generator 14 (FIGURE 1). The signal comprising the digit 1 pulses supplied to the terminal 46 is as represented by the waveform K of FIGURE 3.

Under the action of the signal represented by the waveform A of FIGURE 3, the monostable circuit 47 supplies a signal as represented by the waveform B of FIGURE 3 to the gate 48. As the gate 48 is also supplied with a signal as represented by the waveform C of FIGURE 3, the output of the gate 48 is a signal as represented by the waveform D of FIGURE 3, this signal being supplied to the amplifier 49 and the monostable circuit 50.

The output of the monostable circuit 50 is therefore a signal as represented by the waveform E of FIGURE 3, this signal being supplied to the gate 51. As the gate 51 is also supplied with a signal as represented by the waveform F of FIGURE 3, the output of the gate 51 is a signal as represented by the waveform G of FIGURE 3, this signal being supplied to the amplifier 52 and the gate 53.

The amplifiers 49 and 52 operate to invert the polarity of the signals supplied to them, so the output signals supplied by the amplifiers 49 and 52 are as represented by the waveforms H and I of FIGURE 3 respectively.

The signals supplied to the gate 54 have waveforms as represented by the waveforms H, I, J and K of FIGURE 3, and the output signal supplied by the gate 54 is therefore as represented by the waveform L of FIGURE 3. In FIGURE 3 the vertical dotted lines indicate successive frames F16, F17, F18 and F1, each having a duration of 125 microseconds. For the purposes of this explanation it is assumed that the frame F18 is a frame in which signalling information is to be transmitted. Thus in the frame F17 no synchronising information is transmitted. To achieve this, therefore, it will be seen that the operation of the part of the transmitting terminal shown in FIGURE 2 is such that the signal represented by the waveform L of FIGURE 3 does not include a pulse corresponding to a digit 1 pulse in either of the frames F17 or F18.

The signals supplied to the gate 53 are as represented by the waveforms G, K and M of FIGURE 3, so that the output signal supplied by the gate 53 is as represented by the waveform N of FIGURE 3. It will be seen that the signal represented by the waveform N of FIGURE 3 only contains pulses in the digit 1 position for the channels in respect of which signalling information is to be transmitted in the frame F18.

The signals represented by the waveforms L and N of FIGURE 3 are combined in the gate 55, so that the signal supplied by the gate 55 is as represented by the waveform 0 of FIGURE 3, this signal being supplied to the gate 56.

As the gate 56 is also supplied with the code groups from the coder pulse generators 14 (FIGURE 1), it will be appreciated that the signal supplied to the terminal 57 is the required output pulse signal for transmission to the outgoing line 29 (FIGURE 1), and it includes the required synchronising signals, the required signalling information in the frames in which signalling information is to be transmitted, and in the frame immediately prior to a frame in which signalling information is to be transmitted does not contain any synchronising signal.

Referring now to FIGURE 4 of the drawings, the incoming pulse signal is received over an incoming line 60. The incoming line 60 is connected to the input of an amplifier 61, the output of which is supplied by way of a timing network 62 and a regenerative circuit 63 to a decoder 64 and a synchronising arrangement 65. In addition, the output of the amplifier 61 is supplied by way of a band-pass filter 66 to an amplifier 67 which supplies a sinusoidal signal having a frequency of 768 kilocycles per second, this being the pulse repetition frequency of the incoming pulse signal. The sinusoidal signal is supplied to the synchronising arrangement 65 and also to a pulse generator 68 which operates to supply a signal to control the timing network 62.

The receiving terminal also includes a frequency divider 69 formed by a chain of cascade-connected two-condition bistable trigger circuits. The frequency divider 69 operates in known manner to divide the frequency of a signal supplied to it from the synchonising arrangement 65 over a lead 70. Several output signals are derived from the frequency divider 69, some of these being as follows. Eight outputs are derived from the frequency divider 69 and are supplied over leads 71 to a series of channel pulse gates 72, the channel pulse gates 72 operating to supply output signals C1, C2 . . . C12, these signals being similar to the corresponding signals produced in the transmitting terminal. Four signals are derived from the frequency divider 69 and are supplied over leads 73, together with the signal supplied from the synchronising arrangement 65 over the lead 70, to decoder pulse gates 74. The decoder pulse gates 74 operate to supply eight output signals hereinafter designed D1, D2 . . . D8, these signals comprising digit 1, digit 2 . . . digit D8 pulses similar to those produced in the transmitting terminal.

The operation of the part of the receiving terminal so far described is as follows. The incoming pulse signal, after regeneration by the regenerating circuit 63, is supplied to the decoder 64 together with the signals D1, D2 . . . D8. The output of the decoder 64 comprises a pulse amplitude modulated signal, the pulses in which correspond to sample amplitudes of the audio frequency signals being transmitted over the various channels. This pulse amplitude modulated signal is supplied to the expandor 75 which operates to restore the amplitudes of the sample amplitudes in a way complementary to the compressor 16 (FIGURE 1) of the transmitting terminal.

The pulse amplitude modulated signal supplied by the expandor 75 is supplied to channel separators 76, together with the signals C1, C2 . . . C12. The channel separators 76 operate to separate the pulses corresponding to the various channels and pass them to equipment individual to the various channels. The equipment for channel 1 only will be considered, as the individual equipment is identical for each channel. The amplitude modulated pulses in respect of channel 1 are supplied from the channel separators 76 to a pulse stretching circuit 77, the output of which is supplied by way of a low-pass filter 78 to an amplifier 79. The output of the amplifier 79, which is supplied to an output terminal 80, is the required reconstituted audio frequency signal.

In the immediately preceding description it has been assumed that the receiving terminal is correctly synchronised with the transmitting terminal. The way in which this is brought about and the way in which the signalling information, when present, is separated out will now be described. In addition to being supplied to the decoder 64, the regenerated signal supplied by the regenerative circuit 63 is supplied to the synchronising arrangement 65. The synchronising arrangement 65, together with a part of the frequency divider 69 is shown in more detail in FIGURE 5 of the drawings to which reference is now made.

The regenerated signal is supplied to a terminal 101 and the sinusoidal signal having a frequency of 768 kilocycles per second is supplied to a terminal 102. The terminal 102 is connected to a delay line 103 which delays the sinusoidal signal by approximately 0.4 microsecond, for a purpose which will be referred to later in the description. Two outputs are taken from the delay line 103, one being supplied by way of an inverter circuit 104 to a two-condition bistable trigger circuit 105.

The bistable circuit 105 comprises first and second similar junction transistors interconnected in such a way that in one stable condition of the bistable circuit 105 the first transistor is conducting and the second transistor is non-conducting, whilst in the other stable condition the first transistor is non-conducting and the second transistor is conducting. For convenience, the two parts of the bistable circuit 105, and also of the other bistable circuits shown in FIGURE 5, which contain the first and second transistors will be referred to hereinafter as the *a* and *b* sides respectively, this notation being shown in FIGURE 5. The two stable conditions of the bistable circuit 105 therefore correspond to the case where the *a* side is "on" and the *b* side is "off" and to the case where the *a* side is "off" and the *b* side is "on."

The signal supplied by the *a* side of the bistable circuit 105 is supplied to an "AND" gate 106, and the signal supplied by the *b* side of the bistable circuit 105 is supplied to an "AND" gate 107. A second input to the gate 106 is supplied from the *b* side of a bistable circuit 108, and a second input to the gate 107 is supplied from the *a* side of the bistable circuit 108. Further reference will be made to the bistable circuit 108 and to its function later in the description.

Each of the gates 106 and 107 has a single output, both these outputs being connected to an "OR" gate 109.

The gate 109 has two outputs, one of which is connected to a train of six bistable circuits 110 to 115 inclusive, which are connected together in cascade in that order, and which in fact form the frquency divider 69 (FIGURE 4). Each of the bistable circuits 110, 111 and 112 divides the frequency of the signal supplied thereto by a factor of two. The bistable crcuit 114 has, however, a feedback path connecting it to the bistable circuit 113, so that the bistable circuits 113 and 114 together divide the frequency of signals supplied to the bistable circuit 113 by a factor of three. The bistable circuit 115 again divides the frequency of signals supplied thereto by a factor of two in the normal manner.

The bistable circuit 105 will supply signals having frequencies of 384 kilocycles per second, so that the bistable circuit 112 supplies a signal having a frequency of 48 kilocycles per second, the bistable circuit 114 supplies a signal having a frequency of 16 kilocycles per second, and the bistable circuit 115 supplies a signal having a frequency of 8 kilocycles per second.

The second output from the gate 109 is supplied by way of an inverter circuit 116 to an "AND" gate 117 together with signals supplied by the *b* sides of the bistable circuits 110 and 111. This means that the signal supplied by the gate 117 comprises pulses having a duration of approximately 1.3 microseconds spaced approximately 10.4 microseconds apart.

The gate 117 has two outputs, one of which is connected to the input of an "AND" gate 118. Four further inputs are supplied to the gate 118 from the *a* sides of the bistable circuits 112, 113, 114 and 115. The signal supplied by the gate 118 therefore comprises pulses having a duration of approximately 1.3 microseconds spaced 125 microseconds apart.

The second output from the delay line 103 is connected by way of an inverter circuit 119 to a pulse generator 120, the output of which is supplied to an "AND" gate 121. Two further inputs are connected to the gate 121, one from the terminal 101 and the other from the gate 117.

The gate 121 has three outputs, one of which is connected to a gate 122, the output of the gate 122 being connected to an inverter circuit 123, the output of which is connected to a further gate 124, the output of which is connected to an integrator circuit 125. The output of the integrator circuit 125 is supplied to a detector circuit 126, together with a reference voltage supplied by a source 127. The output of the detector circuit 126 is supplied to a gate 128. The gate 128 has a second input which is connected to the output of the gate 124. The output of the gate 128 is connected to the bistable circuit 108.

The output of the gate 118 is connected by way of an inverter circuit 129 to the gate 122. The gate 122 operates such that signals are able to pass from the gate 121 to the inverter circuit 123 by way of the gate 122 unless a signal is supplied from the inverter circuit 129 to the gate 122.

In addition, the inverter circuit 129 supplies a signal to a further inverter circuit 130 by way of a differentiating circuit 131. The output of the differentiating circuit 131 is connected to earth by way of a rectifier element 132, the rectifier element 132 being poled so that only the negative-going half-cycles of the signal supplied by the differentiating circuit 131 are able to reach the inverter circuit 130.

The output of the inverter circuit 130 is supplied to a gate 133, the output of which is connected to a pulse generator 134. The second output from the gate 121 is connected to a pulse generator 135, the output of which is connected to the gate 133. The gate 133 operates such that signals are supplied from the inverter circuit 130 to the pulse generator 134 unless the pulse generator 135 is supplying a signal to the gate 133.

The pulse generator 134 supplies two outputs, one of which is supplied to an "AND" gate 136. The gate 136 has a further input supplied to it, this input being derived from the third output from the gate 121, and the second being derived from the *a* side of the bistable circuit 116. The gate 136 supplies an output to a terminal 137.

The second output from the pulse generator 134 is supplied to a gate 138, the output of the gate 138 being supplied to the gate 124. The operation of the gate 124 is such that signals are able to pass from the inverter circuit 123 to the integrator circuit 125 by way of the gate 124 unless the gate 138 is supplying a signal to the gate 124.

A second output is supplied from the *a* side of the bistable circuit 108 to a differentiating circuit 139, and a second output is supplied from the *b* side of the bistable circuit 108 to a differentiating circuit 140. The differentiating circuits 139 and 140 are each connected to an "OR" gate 141 the output of which is connected to a pulse generator 142.

The output of the pulse generator 142 is connected to the gate 138. The operation of the gate 138 is such that signals are able to pass from the pulse generator 134 to the gate 124 by way of the gate 138 unless the pulse generator 142 is supplying a signal to the gate 138.

The operation of the equipment will now be described, reference also being made to the waveforms shown in FIGURE 6 of the drawings. It is convenient first to assume that no signalling information is being transmitted, that is to say, that the synchronising signals are present in the incoming signal continuously and further that the receiving terminal is correctly synchronised with the transmitting terminal.

The output of the inverter circuit 119 comprises a pulse signal represented by the waveform A of FIGURE 6, having a pulse repetition frequency of 768 kilocycles per second, this signal being supplied to the pulse generator 120 which supplies a pulse signal, represented by the waveform B of FIGURE 6, of the same frequency, comprising pulses having a duration of approximately 0.3 microsecond spaced approximately 1.3 microseconds apart. The signal (waveform B of FIGURE 6) supplied by the pulse generator 120 forms one of the input signals to the gate 121. The second input signal to the gate 121 is the signal, represented by the waveform C of FIGURE 6, supplied by the gate 117, this being a pulse signal comprising pulses having a duration of approximately 1.3 microseconds spaced approximately 10.4 microseconds apart. Each eighth pulse of the signal (waveform B of FIGURE 6) supplied by the pulse generator 120 coincides in time with a pulse of the signal (waveform C of FIGURE 6) supplied by the gate 117. The third input signal supplied to the gate 121 comprises the incoming signal, represented by the waveform D of FIGURE 6, from the terminal 101.

The incoming signal (waveform D of FIGURE 6) includes the synchronising signal, which includes a pulse as shown in FIGURE 6 in the first pulse position of the channel group corresponding to the channel 12 in each frame. For simplicity only this pulse is shown in the waveform D of FIGURE 6, although the incoming signal represented by the waveform D of FIGURE 6 will, of course, include many more pulses. As the equipment has been assumed to be correctly synchronised, it will be appreciated that this pulse in the incoming signal (waveform D of FIGURE 6) will be the only pulse in the incoming signal to arrive at the gate 121 in synchronism with the pulses in the signal (waveform B of FIGURE 6) supplied by the pulse generator 120 and in the signal waveform C of FIGURE 6) supplied by the gate 117. The output of the gate 121 will, therefore, comprise a signal, represented by the waveform E of FIGURE 6, including pulses having a duration of approximately 0.3 microsecond spaced 125 microseconds apart. This signal (waveform E of FIGURE 6) is supplied to the gate 122.

The second input signal to the gate 122 comprises the signal, represented by the waveform F of FIGURE 6, supplied by the inverter circuit 129, this signal including pulses having a duration of approximately 1.3 microseconds spaced 125 microseconds apart. Again, as it has been assumed that the receiving terminal is correctly synchronised, the pulses in the signal (waveform F of FIGURE 6) supplied by the inverter circuit 129 will be in synchronism with the pulses in the signal (waveform E of FIGURE 6) supplied by the gate 121, so that the pulses in the signal (waveform E of FIGURE 6) supplied by the gate 121 will not reach the inverter circuit 123. In other words, when the equipment is correctly synchronised the gate 122 does not supply an output signal.

The effect of the delay line 103 is now apparent, as it operates such that the pulses in the signal (waveform E of FIGURE 6) supplied by the gate 121 occur substantially at the mid-time of the pulses in the signal (waveform F of FIGURE 6) supplied by the inverter circuit 129, so as to ensure that there is no output from the gate 122 when the receiving terminal is correctly synchronised.

Still assuming that the receiving terminal is correctly synchronised, consideration will now be given to the manner in which it operates during the two frames in each 18, during which no synchronising information is transmitted. Considering two such frames, in the second frame the first digit in each channel group may be either "0" or "1" to provide the required signalling information, but in the first of these frames, the first digit in each channel group is "O," that is, there is no pulse present in the incoming signal in any of the 12 pulse positions in the frame corresponding to the first digits of each of the channels.

This means that during the first of these frames there will be no pulse in the signal (waveform E of FIGURE 6) supplied by the gate 121. During normal frames, when there has been a pulse in the signal (waveform E of FIGURE 6) supplied by the gate 121, this pulse, in addition to being supplied to the gate 122 as previously described, is supplied to the pulse generator 135. The pulse generator 135 is, in fact, a two-condition monostable trigger circuit which is triggered into its unstable condition by pulses supplied to it from the gate 121, and which returns to its stable condition comparatively slowly; in so doing supplying to the gate 133 a pulse of longer duration than the pulse supplied to it.

This means that during normal frames, in which the synchronising signal is present, the inverter circuit 130 is not able to supply a signal to the pulse generator 134, and the pulse generator 134 does not therefore supply a signal to the gate 136 in coincidence with the pulse in the signal (waveform E of FIGURE 6) supplied to the the gate 136 by the gate 121.

In the first of the frames now being considered, however, this pulse in the signal (waveform E of FIGURE 6) supplied by the gate 121 is not present, so that signals are able to pass from the inverter circuit 130 to the pulse generator 134. The signal (waveform F) supplied by the inverter circuit 129 is supplied to the inverter circuit 130 by way of the differentiating circuit 131 and rectifier 132, so that the signal reaching the inverter circuit 131 comprises a short positive-going pulse which starts substantially in coincident with the leading edge of the pulse in the signal (waveform F of FIGURE 6) supplied by the inverter circuit 129. This pulse supplied by the inverter circuit 130 is supplied to the pulse generator 134, which is similar to the pulse generator 135, but is such as to remain in its unstable uncondition for approximately 190 microseconds. This means that a pulse of this duration is supplied by the pulse generator 134 to the gates 136 and 138.

Considering first the pulse supplied to the gate 138, this pulse will pass the gate 138 and be supplied to the gate 124, so that the gate 124 will not pass any signal which is supplied, during the second frame, by the inverter circuit 123, to the integrator circuit 125.

Considering now the gate 136. During the second frame, the gate 136 will have supplied to it throughout the whole duration of the frame a pulse from the pulse generator 134. This means that any signal passed by the gate 121 during the second frame will be able to pass the gate 136, and it will be realised that the signal passed by the gate 121 will, in fact, comprise any pulse which is present in the first digit position of any one of the channel groups in that frame. Such pulses are those which provide the required signalling information, and they are supplied by the gate 136 to the terminal 137, and thence to the part of the receiving terminal where they are to be used.

The operation in the case where the receiving terminal is not initially correctly synchronised will now be considered. The gate 121 then operates to pass the pulses which are present in the *k*th pulse position in each channel group, where *k* may have any value from 1 to 8 inclusive.

As approximately half the pulse positions in the incoming signal, other than the first pulse position in each channel group, contain pulses, this means that during each frame it is likely that the gate 121 will supply several pulses to the gate 122. If *k* is equal to 1 (but the equipment is not correctly synchronised) then of course one pulse will be supplied by the gate 121 to the gate 122 in each frame, this being the pulse in the first digit portion in the channel group for the twelfth channel. This pulse will not, however, coincide with a pulse in the signal (waveform F of FIGURE 6) supplied by the inverter circuit 129.

Some if not all these pulses supplied by the gate 121 must be passed by the gate 122, because they are out of coincidence with the pulse in the signal (waveform F of FIGURE 6) supplied to the gate 122 by the inverter circuit 129. These pulses will therefore be supplied by way of inverter circuit 123 to the gate 124. For the moment it will be assumed that the gate 124 passes all signals supplied to it, so these pulses are supplied to the integrator circuit 125 and the gate 128. The level of the signal supplied to the detector circuit 126 by the reference source 127 is such that the detector circuit 126 supplies a signal to the gate 128 if the integrator circuit 125 has been supplied with approximately three or more pulses during an interval equal to a few frames.

If therefore a further pulse is supplied by the gate 124 whilst the detector circuit 126 is supplying a signal to the gate 128, this pulse will pass the gate 128 and be supplied to the bistable circuit 108. This causes the bistable circuit 108 to reverse its condition, so that if the gate 106 were previously supplying the signal from the *a* side of the bistable circuit 105 to the gate 109, it no longer does so, and instead a signal is supplied by way of the gate 107 from the *b* side of the bistable circuit 105 to the gate 109. The effect of this is to shift all the signal derived from the gate 109 and associated bistable circuits 110 to 116 inclusive by one pulse position relative to the incoming signal.

If this shift is such as to bring the equipment into the correct synchronism there will be no further signal passed by the gate 122, for the reasons previously described. If, on the other hand, the equipment is still not in correct synchronism, then a further pulse will be supplied by the gate 128 to cause a further reversal of the condition of the bistable circuit 108, and in consequence a further shift of one pulse position relative to the incoming signal. This process will continue until the correct synchronism is obtained and no further signal is supplied by the gate 122.

The reason for including the integrator circuit 125, detector circuit 126, reference source 127 and gate 128 is to prevent the equipment from losing correct synchronism merely because an occasional spurious pulse happens to appear in the first pulse position in a channel group, other than that corresponding to the twelfth channel, of the incoming signal.

In the immediately preceding description it has been assumed that the gate 124 passes all signals supplied to it. This, of course, is not the case, as the gate 124 will not pass signals when it is itself being supplied with a signal from the gate 138. The only occasion when this will be so is during the frame in which signalling information is being transmitted, and it will be appreciated that this is necessary because in that frame the first pulse positions in the channel groups may well include a sufficient number of pulses to cause undesired operation of the bistable circuit 108 and consequent loss of synchronism. This is prevented by the gate 124.

It is however necessary that the gate 138 should not prevent the gate 124 from passing signals to the integrator circuit 125 at times when the equipment is out of synchronism, and is therefore in the course of operating to come back into the correct synchronism.

This is brought about as follows. Each time the bistable circuit 108 reverses its condition, a pulse is supplied by either the differentiating circuit 139 or the differentiating circuit 140 to the gate 141, and thence to the pulse generator 142. The pulse generator 142 then operates to supply a long pulse to the gate 138, so that for the duration of this pulse the pulse generator 134 is not able to supply by way of the gate 138 to the gate 124. The duration of this pulse is selected to be sufficiently long normally to prevent the gate 138 passing any signal until the equipment has had time to get back into the required synchronism.

As previously mentioned the pulses which provide the required signalling information are supplied to the terminal 137. The way in which these pulses are used will now be described with reference to FIGURE 4 of the drawings.

These pulses are supplied from the synchronising arrangement 65 over the lead 82 to signalling separators 83 to which are also supplied the signals C1, C2 . . . C12. The signalling separators 83 operate to separate the pulses corresponding to the various channels and pass them to equipment individual to the various channels. The equipment for channel 1 only will be considered, as the individual equipment is identical for each channel. The pulses representing the signalling information are supplied from the channel separators 83 to a pulse stretching circuit 84, the output of which is supplied to an electromagnetic relay 85. It is arranged that when signalling information is being transmitted in respect of channel 1 the relay 85 is operated and supplies a signal to an output terminal 86, from whence it is supplied to the part of the receiving terminal where the signalling information is to be used.

We claim:

1. Transmitting terminal equipment for a multichannel pulse modulation communication system, said equipment comprising (1) sampling means for each channel to which intelligence information for the respective channel is supplied, (2) time division multiplexing means to which each sampling means is connected and which provides a succession of pulse frames each of which includes the pulse representation of one sample of intelligence information from each channel, (3) a synchronizing signal pulse source providing a periodic synchronizing pulse pattern, each pattern occurring during a respective frame, (4) a service signal pulse source providing pulse information in periodic service frames, the service pulses having the same time positions in a frame as the synchronizing pulse pattern, (5) further time division multiplexing means connected to both said sources to combine the service signal with the synchronizing signal, (6) signal combining means connected to both said multiplexing means to combine in time division the signals supplied by the multiplexing means, (7) the further multiplexing means including circuit means to modify the synchronizing pulse pattern in a respective frame prior to each said service frame to identify that service frame as such, (8) the output signal from said signal combining means comprising a succession of frames carrying intelligence information, periodic service frames in which service signals replace the synchronizing signal and periodic frames, respectively prior to each service frame, in which the synchronizing signal is modified.

2. Transmitting terminal equipment for a multi-channel pulse code modulation communication system in which the intelligence information for each channel is sampled, coded and multiplexed with the coded samples of the other channels, one complete cycle of coded samples constituting a frame, said equipment comprising (1) coding means to supply a pulse code signal in respect of the channel intelligence,
(2) a synchronizing signal pulse source to supply a synchronizing signal having a periodic synchronizing pulse pattern and each pattern occurring during a respective frame,
(3) a service signal pulse source to supply a service signal in periodic service frames and the service pulses having the same time positions in a frame as the synchronizing pulse pattern,
(4) time division multiplexing means to which the coding means and the synchronizing and service signal pulse sources are connected,
(5) said multiplexing means comprising gate means to which the pulse code signal, the synchronizing signal and the service signal are passed,
(6) means to supply to the gate means a service-frame-frequency pulse signal having a pulse repetition frequency equal to the repetition frequency of said service frames to cause the gate means to combine the synchronizing and service signals alternately with the pulse code signal to derive an output signal,
(7) a monostable circuit,
(8) a circuit connection between the monostable circuit and the means to supply the service-frame-frequency signal to cause the monostable circuit to be triggered to its astable state at the service frame frequency, and
(9) a circuit connection between the monostable circuit and the gating means to cause the gating means to suppress the synchronizing signal in the output signal during a respective frame prior to each service frame.

3. In a multi-channel pulse modulation communication system in which the transmitted signal comprises a pulse sequence representing sampled intelligence information for the various channels combined in time division multiplex, each complete cycle of pulses constituting a frame and a synchronizing signal comprising a regularly repeated pulse pattern, each said pulse pattern occurring in a respective frame, transmitting terminal equipment including (1) means to impose, in addition to said intelligence information, a service signal comprising pulse service information in periodic service frames and
(2) means to modify the synchronizing signal pulse pattern in a respective frame prior to each said service frame.

4. Transmitting terminal equipment for a multi-channel pulse modulation communication system according to claim 3, in which said means to modify the synchronizing signal pulse pattern periodically includes (1) two inhibiting circuits, each comprising,
    (a) a pulse source to provide a pulse signal having a pulse repetition frequency equal to half the frame repetition frequency, and a pulse length equal to one frame period,
    (b) monostable means triggered periodically at the repetition frequency of said service frames, and
    (c) gate means supplied by said pulse source and and by said monostable means to provide an output signal comprising a pulse of length equal to one frame period at the repetition frequency of said service frame,
(2) means being provided to trigger the monostable means of one of said inhibiting circuits at the repetition frequency of said service frames,
(3) circuit means to connect the other monostable means to the output of the gate means of said one inhibiting circuit,
(4) the output signals of the two gate means each being pulses of frequency equal to that of the service frame repetition frequency but phase displaced by an integral number of frame periods,
(5) further gate means to which said output signals are supplied, and
(6) means connected to said further gate means to supply said synchronizing pulse pattern,
(7) said output signals from said two gate means effecting a suppression of the synchronizing pulse pattern in two frames in every period of the service signal, the second of the two frames constituting the service frame.

5. Transmitting terminal equipment for a multi-channel pulse modulation communication system according to claim 3, in which said means to modify the synchronizing signal pulse pattern periodically comprises (1) a first AND-gate,
(2) a first monostable device connected to one input of the first AND-gate and having a duration of monostable state of between one and two frame periods,
(3) means connected to said monostable device to trigger it at the repetition frequency of the service frame,
(4) a second input of the first AND-gate,
(5) means connected to said second input to provide a pulse signal comprising a pulse of length equal to one frame period at least once in every period of the service signal,
(6) the output signal of the first AND-gate then being a pulse of length equal to the duration of one frame at a frequency equal to the repetition frequency of the service frame,
(7) a second AND-gate,
(8) a second monostable device connected to one input of the second AND-gate and having a duration of monostable state of between one and two frame periods,
(9) said second monostable device being connected to and triggered by the output of said first AND-gate,
(10) a second input of the second AND-gate,
(11) means connected to said second input to provide a pulse signal comprising a pulse of length equal to one frame period at least once in every period of the service signal,
(12) the output signal of the second AND-gate then being a pulse of length equal to the duration of one frame at a frequency equal to the repetition frequency of the service frame,
(13) a third AND-gate from which the transmitted synchronizing signal is derived and
(14) two inputs of said third AND-gate to which inputs said output signals of the first and second AND-gates are supplied, said last-named output signals being effective to suppress any output signal from the third AND-gate during their respective frame-length pulses.

6. Receiving terminal equipment for use with transmitting terminal equipment according to claim 3 and comprising (1) an input terminal to which the received signal is supplied,
(2) means connected to said input terminal to isolate the samples of intelligence information of each channel from those of the remaining channels,
(3) there being a fixed phase orientation between the isolated samples of the different channels,
(4) distribution equipments for each channel respectively, (5) the isolating means being connected to the distribution equipments to allocate a respective channel sample to each distribution equipment, (6) means, connected to the isolating means and to the distribution equipment, to generate a local synchronizing signal the phase of which determines the orientation of said isolated samples with respect to the distribution equipments, (7) and comparison means, connected to said input terminal and to the local synchronizing signal generating means, in which the received synchronizing signal is compared in phase with the local synchronizing signal, (8) the comparison means providing an output signal which is dependent upon the relative phase of the two synchronizing signals, (9) bistable means, included in the comparison means and connected to receive said output signal, effective to vary the phase of the local synchronizing signal in steps of one cycle of the basic pulse repetition rate of the received signal until the two synchronizing signals are in synchronism.

7. Receiving terminal equipment in accordance with claim 6 wherein the means to generate a local synchronizing signal comprises (1) bistable means triggered by a signal having a frequency equal to the basic pulse repetition rate of the received signal and providing two output signals of frequency equal to half the basic pulse repetition rate and mutually in anti-phase, (2) first and second AND-gates each having two inputs and an output, said two output signals being supplied to one input of each of the two AND-gates respectively, and (3) a further bistable means having two outputs and a trigger input, each output being connected to a respective one of the remaining two inputs of the first and second AND-gates, (4) an output signal being provided by that one of the first and second AND-gates to which a signal is supplied by said further bistable means, and wherein (5) means is provided to connect the output of said comparison means to said trigger input, (6) said output signal from the comparison means being effective to trigger the further bistable means from one to the other bistable state when the two synchronizing signals are not in synchronism, (7) the output signal provided by said one of the first and second AND-gates determining the phase of said local synchronizing signal and the orientation of said isolated samples with respect to said distribution equipments.

8. Receiving terminal equipment for use with transmitting terminal equipment according to claim 5, said receiving terminal equipment including (1) a first isolating AND-gate having three inputs and an output, (2) means connected to a first of said three inputs to generate a gating pulse of frequency equal to the basic pulse repetition rate of the received signal, (3) means, connected to a second of said inputs, to generate a gating pulse of frequency equal to the repetition frequency of the service information pulses, (4) an input terminal to which the received signal is supplied, (5) regenerating means connected to said input terminal, (6) means to connect the output of said regenerating means to the third of said three inputs, (7) a second isolating AND-gate having two inputs one of which is directly connected to the output of said first isolating AND-gate, (8) an inhibit gate connected to supply, when enabled, a pulse of frequency equal to the frame repetition frequency, (9) a first monostable pulse source,

(10) a trigger input of the first monostable pulse source being connected to the output of said inhibit gate,

(11) the first monostable pulse source having a duration of monostable state of between one and two times the frame period, and having an output connected to the remaining input of said second isolating AND-gate, and

(12) a second monostable pulse source,

(13) a trigger input of the second monostable pulse source being connected to the output of said first isolating AND-gate,

(14) the second monostable pulse source having an output connected to the inhibit input of said inhibit gate,

(15) an output signal from said second isolating AND-gate being available in any frame of the incoming signal only when the preceding frame contains no synchronizing pulse pattern.

References Cited by the Examiner

UNITED STATES PATENTS

| | | | |
|---|---|---|---|
| 2,927,965 | 3/1960 | Waer | 179—15 |
| 2,949,503 | 8/1960 | Andrews et al. | 179—15 |
| 2,984,706 | 5/1961 | Jamison et al. | 179—15 |
| 3,057,962 | 10/1962 | Mann et al. | 179—15 |

DAVID G. REDINBAUGH, *Primary Examiner.*

T. G. KEOUGH, R. L. GRIFFIN, *Assistant Examiners.*